May 15, 1934.  J SCHMIDT  1,958,720

CLEANER AND POLISHER

Filed June 29, 1931

INVENTOR.
John Schmidt.
BY Philip A. Minnis
ATTORNEY

Patented May 15, 1934

1,958,720

UNITED STATES PATENT OFFICE 1,958,720

CLEANER AND POLISHER

John Schmidt, Buffalo, N. Y., assignor to Food Machinery Corporation, San Jose, Calif., a corporation of Delaware Application June 29, 1931, Serial No. 547,528

12 Claims. (Cl. 146—202)

This invention relates to cleaning and polishing machines such as are used in the fruit packing industry to clean and polish the skins of fruit prior to packing.

Although the invention is susceptible of application to various types of cleaning and polishing machines, I have found it to be particularly useful in connection with that type of apparatus employing rotating cylindrical brushes arranged in pairs with parallel brushes, rubbing boards, or the like, arranged adjacent the outer sides of the brushes so as to cooperate therewith in brushing the fruit, and having intermediate partitions arranged between the brushes whereby the pieces of fruit are urged outwardly toward the brushing runway formed by the rubbing boards and the brushes.

In the operation of this type of apparatus the brushes are rotated outardly toward the rubbing boards so that pieces of fruit deposited upon the brushes are urged into the brushing runway formed by the brushes and adjacent rubbing boards. On account of the irregular manner in which the fruit is fed to the brushes, however, it often happens that a runway becomes overloaded, whereby many pieces of fruit are crowded inwardly away from the rubbing board toward the intermediate partition, and these pieces oftentimes pass entirely over the polisher without having an opportunity of coming into contact with the rubbing board whereby they are not properly polished, and this result may occur in one runway while an adjacent runway may be undersupplied and could easily take care of the extra fruit if it could be transferred thereto.

It is, therefore, the object of my invention to provide a transfer means for polishing apparatus of the type having adjacent fruit brushing runways which will effectively distribute fruit to adjacent runways and which will equalize the load between the runways so that all of the fruit will be evenly and thoroughly polished.

More specifically, it is an object of the invention to provide diverting or deflecting means associated with the partition between adjacent fruit runways to cause excess fruit to pass from one runway to another and thereby relieve an overcrowded condition in one runway and distribute the load equally to the other runway.

With the above mentioned and other objects in view the invention consists in the novel construction and combination of parts hereinafter described, illustrated in the accompanying drawing, and set forth in the claims hereto appended, it being understood that various changes and modifications may be resorted to without departing from the spirit or scope of the invention, and I deem myself entitled to all such changes and modifications as fall within the scope of the claims hereto appended.

Referring to the drawing, wherein like reference characters denote like parts throughout the several views.

Figure 1:
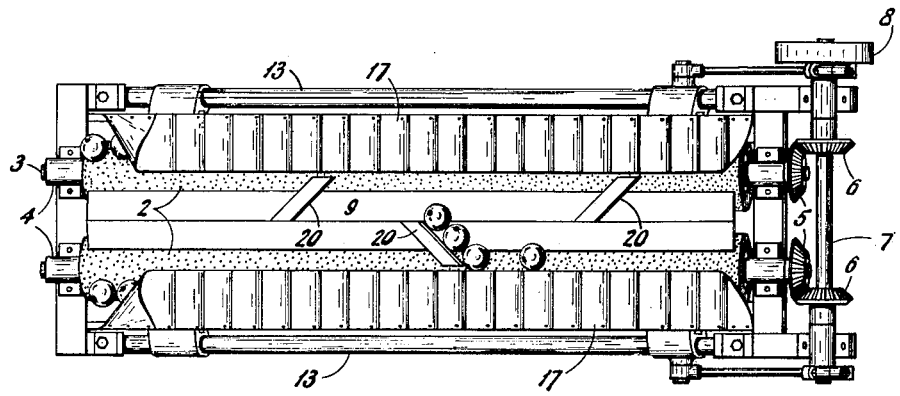
Figure 1 is a plan view of a machine embodying the invention and having the feed and discharge ramps removed.
Figure 2:
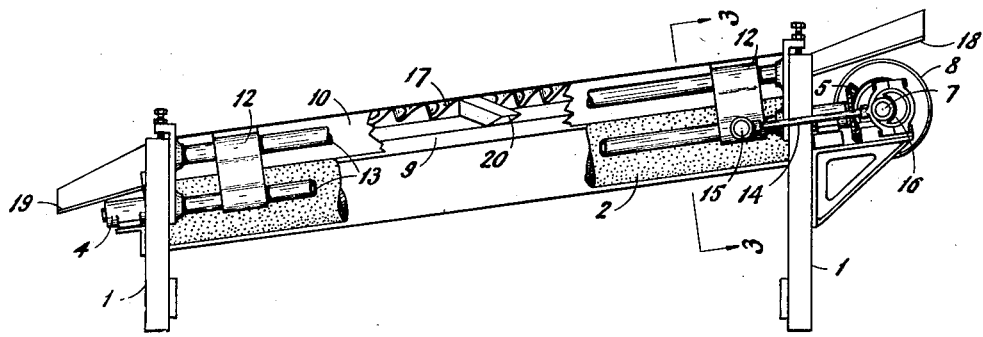
Figure 2 is a side elevation of the apparatus illustrated in Figure 1, some of the parts being broken away to better illustrate certain details of construction.
Figure 3:
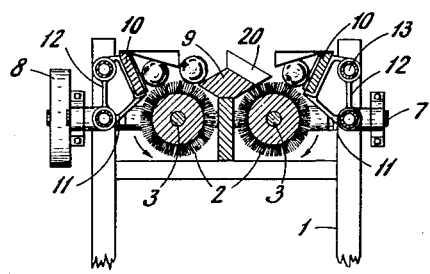
Figure 3 is a transverse section taken on the line 3—3 of Figure 2, illustrating the position of the diverting strips with respect to the center partition between adjacent runways.

The apparatus illustrated is supported by suitable legs 1 and includes a pair of cylindrical brushes 2 arranged in parallel relation and preferably inclined downwardly towards the discharge end in order to aid the passage of the fruit through the machine. The brushes 2 are carried by shafts 3 journaled in suitable bearings 4 and are adapted to be rotated in the directions indicated by the arrows by means of the bevel gears 5 secured to the shafts 3 and driven by bevel gears 6. The gears 6 are secured to a drive shaft 7 which may be driven from any suitable source of power through the medium of the pulley 8.

Disposed between the brushes 2, and parallel and coextensive therewith, is a partition 9 having inclined sides as shown whereby the fruit is deflected toward the brushes.

Mounted adjacent the outer surface of each of the brushes and parallel therewith is a rubbing board 10, which is carried by brackets 11 integral with the yokes 12. The yokes 12 are slidably mounted on the shafts 13 extending longitudinally of the apparatus and are adapted for reciprocation. This is accomplished by means of the connecting rods 14 pivotally secured to the yokes at one end of the machine at 15 and driven by the eccentrics 16 secured to the drive shaft 7. The inner faces of the rubbing boards may be provided with a resilient material, if desired, in order to minimize danger of damaging the fruit.

By this construction it will be seen that brushing runways or troughs are provided between the rubbing boards 10 and the rotating brushes 2, and the direction of rotation of the brushes is such as to urge the pieces of fruit into this runway, where the combined action of the brushes and the rubbing boards serves to brush the fruit thoroughly while turning it about on various axes.

In order to assist the pieces of fruit to pass throughout the length of the runways and also to exert a yielding pressure against the fruit in order to secure a more thorough brushing action, a strip of material 17, such as canvas or the like, extends substantially the full length of each rubbing board and is secured to the upper edge thereof so that it extends horizontally over the runway. The material 17 is folded transversely at intervals to provide spaced ruffles with the folds lying inwardly and directed toward the discharge end of the machine so that as the rubbing boards are reciprocated the pieces of fruit in the runways are engaged by the ruffles and propelled forwardly from one fold to the next.

At the receiving end of the apparatus a feed runway or ramp 18 is provided for directing the fruit onto the brushes and the fruit is discharged from the machine over the discharge ramp 19.

In the operation of the machine as thus far described it will be seen that as the pieces of fruit are fed to the brushes over the ramp 18 the rotation of the brushes carries them beneath the ruffled strips 17 and into contact with the rubbing boards 10. The combined action of the rotating brushes and the reciprocating rubbing boards causes the pieces of fruit to be turned about on various axes and be thoroughly brushed, while the reciprocation of the ruffles in the strips 17 causes the fruit to be advanced toward the discharge end of the machine.

It often happens, however, that one or the other of the runways under the strips 17 becomes full of fruit so that when additional pieces are fed thereto their weight causes some of the pieces in the runway to be crowded out of line towards the partition 9. Moreover, many of the pieces being fed, not being able to get into the runway on account of it being already filled, are crowded abreast of the pieces in the runway so that they move along beside the partition 9, and these pieces, as well as those crowded out of line, are finally discharged from the machine without having had an opportunity to get under the strip 17 into the brushing runway. These pieces of fruit are consequently not properly brushed.

Due to the irregular feeding of the fruit this situation often time develops in one of the runways while the adjacent runway may have plenty of room for the excess fruit if it could only be gotten into that runway. I have discovered that this can be done by mounting diverting strips or deflectors 20 at intervals along the sloping sides of the partition 9 and in oblique position, whereby they divert any pieces of fruit which may be traveling adjacent the partition from one side of the partition to the other. Any number of these deflectors may be secured to the partition as desired so that any excess pieces of fruit traveling alongside the partition are shunted back and forth from side to side of the partition until they eventually find a place in one or the other of the brushing runways under the strips 17. In this manner practically all of the fruit is enabled to find its way into one or the other of the runways in spite of irregular or unequal feeding, and all of the fruit passing through the machine is, thereby, cleaned and polished.

Having now described my invention and in what manner the same may be used, what I claim as new and desire to protect by Letters Patent is:

1. In a cleaning and polishing machine, a pair of parallel rotary brushes, a partition therebetween, means for rotating the brushes in opposite directions to move their upper surfaces away from the partition, and means adjacent each side of the partition for directing articles moving over a brush beside the partition from one side of the partition to the other.

2. In a cleaning and polishing machine, a pair of parallel rotary brushes, a partition therebetween, means for rotating the brushes in opposite directions to move their upper surfaces away from the partition, and means associated with each side of said partition for interrupting the passage of articles moving over a brush beside the partition and directing them from one side of the partition to the other.

3. In a cleaning and polishing machine, a pair of parallel rotary brushes, a partition therebetween, and a plurality of diverting means arranged adjacent the partition on opposite sides thereof and disposed to obstruct the passage of articles moving over said brushes adjacent the partition and divert them from one side of the partition to the other.

4. In a cleaning and polishing machine, the combination with a pair of spaced rotary brushes mounted in parallel relation, a partition mounted between and parallel to said brushes, a plurality of diverting members mounted obliquely upon said partition to cause articles moving over a brush adjacent the partition to be diverted from one side of the partition to the other.

5. In a cleaning and polishing machine, a pair of parallel rotary brushes, a partition therebetween having inclined sides, and a diverting member obliquely secured to one of said sides and adapted to divert articles moving over a brush beside the partition from one side of the partition to the other.

6. In a cleaning and polishing machine, a pair of parallel rotary brushes, a partition therebetween, means for rotating the brushes in opposite directions to move their upper surfaces away from the partition, and means disposed on each side of the partition to interrupt the passage of articles moving over a brush beside the partition and direct them from one side of the partition to the other.

7. In a cleaning and polishing machine, a pair of parallel rotary brushes, a partition therebetween forming central brushing runways adjacent thereto, side walls adjacent the outer sides of the brushes forming outer brushing runways therewith, means for rotating the brushes in opposite directions to move their upper surfaces away from the partition, and means disposed adjacent the partition for interrupting the passage of articles moving along a central runway and directing them to the opposite side of the partition.

8. In a cleaning and polishing machine, a pair of parallel rotary brushes, a partition therebetween having inclined side and cooperating with the brushes to form central brushing runways adjacent thereto, side walls adjacent the outer sides of the brushes forming outer brushing runways therewith, means for rotating the brushes in opposite directions to move their upper surfaces away from the partition, and diverting members obliquely secured to each side of the partition to divert articles moving along the central runways from one side of the partition to the other.

9. In a cleaning and polishing machine, a pair of parallel rotary brushes, a partition therebetween forming central brushing runways adjacent thereto, rubbing walls adjacent the outer sides of the brushes forming outer brushing runways therewith, means for reciprocating said rubbing walls, means for rotating the brushes in opposite directions to move their upper surfaces toward said rubbing walls, and means disposed adjacent each side of the partition for interrupting the passage of articles moving along the central runways and directing them to the opposite side of the partition.

10. In a cleaning and polishing machine, a pair of parallel rotary brushes, a partition therebetween forming central brushing runways adjacent thereto, rubbing walls adjacent the outer sides of the brushes forming outer brushing runways therewith, means for reciprocating said rubbing walls, means for rotating the brushes in opposite directions to move their upper surfaces toward said rubbing walls, and means associated with each side of said partition for obstructing the passage of articles moving along the central runways and diverting them to the opposite side of the partition.

11. In a cleaning and polishing machine, a pair of parallel rotary brushes, a partition therebetween forming central brushing runways adjacent thereto, rubbing walls adjacent the outer sides of the brushes forming outer brushing runways therewith, means for reciprocating said rubbing walls, means for rotating the brushes in opposite directions to move their upper surfaces toward said rubbing walls, and diverting means associated with each side of said partition and in alternate relation to cause articles moving along the central runways to be diverted from one side of the partition to the other.

12. In a cleaning and polishing machine, a pair of parallel rotary brushes, a partition therebetween having inclined sides and cooperating with the brushes to form central brushing runways adjacent thereto, rubbing walls adjacent the outer sides of the brushes forming outer brushing runways therewith, means for reciprocating said rubbing walls, means for rotating the brushes in opposite directions to move their upper surfaces toward said rubbing walls, and diverting means associated with each side of said partition and in alternate relation to obstruct the passage of articles moving along the central runways and divert them from one side of the partition to the other.

JOHN SCHMIDT.